Patented Feb. 26, 1935

1,992,548

UNITED STATES PATENT OFFICE 1,992,548

STRUCTURE MADE FROM COMMINUTED MATERIALS

Charles R. Short, Dayton, Ohio, assignor, by mesne assignments, to General Motors Corporation, Detroit, Mich., a corporation of Delaware No Drawing. Application January 16, 1929, Serial No. 333,013

14 Claims. (Cl. 75—1)

This invention relates to the art of uniting finely divided materials and more particularly to the art of uniting finely divided metals so as to form a somewhat homogeneous structure.

In one of its aspects, the present invention relates to the manufacture of bodies formed of a metallic structure which is preferably porous so that it is capable of absorbing a quantity of lubricant, making it desirable for use as a bearing material.

Generally speaking, it is one of the objects of the present invention to provide a process of uniting finely divided materials or substances, one of which does not tend to unite readily with others. For example, the problem to be solved by the present invention may be one where three finely divided substances, intimately mixed, are to be joined together. Under conditions which would cause two of these substances to unite or cohere, the third substance may remain separated. This may be due to the fact that there is relatively great attraction or affinity between the substances which readily cohere or unite whereas the affinity between the third substance and either of the other is relatively weak. Generally speaking, the object of the present invention is solved by first intimately mixing this third substance and one of the other substances to be united and subjecting them to a treatment by which the particles of this third substance will be coated by this other substance. In other words, the substances may be designated as A, B and C; A and B unite readily; but it has been found difficult to unite B and the third substance C in the presence of the substance A because of the greater attraction between A and B. If, however, B and C are first intimately mixed alone and there is brought about a condition whereby B will unite with or coat the particles of the substance C, then the fine particles of C, which are now coated with B, may be intimately mixed with finely divided A and united therewith under conditions which would be conducive to the union of A and B if these substances alone were the only ones to be considered.

One important use to which the present invention may be put is the manufacture of metallic structures for making bearings. Bearings have been made from powdered materials such as copper, tin and graphite which are intimately mixed and briquetted to the desired shape and are then sintered in a non-oxidizing atmosphere so as to form a metallic structure which is more or less porous. Such a structure may be known as porous bronze. If porous brass is desired, then zinc will be substituted for tin, or tin and zinc may both be present with the copper. It is well known that cast iron makes a fairly good bearing, especially for a steel part, but heretofore it has been impossible to make a porous metallic structure from a mixture of finely divided metals including finely divided cast iron for the reason that cast iron does not readily unite in a heat treatment with particles of the bonding metals. If a mixture of finely divided copper, zinc and iron is briquetted and then heated sufficiently to bring the zinc into such condition that it will unite or diffuse, the zinc will unite with the copper to a much greater extent than with the iron because of the greater affinity between zinc and copper. If, however, the zinc particles and iron particles are first mixed together and then heated to a certain temperature, the zinc particles will coat the iron particles or unite with them in such a manner that they are permanently attached to the iron particles. Then, when the zinc coated iron particles are mixed with the finely divided copper, briquetted to the desired form, and heated to a temperature sufficient to cause zinc to diffuse or alloy with copper, the copper will alloy or diffuse with the zinc to form a matrix of brass which is firmly bonded to the iron particles. The zinc, having become so intimately related to the iron, draws the other metals to the iron so that the alloy of zinc and copper is so intimately related to the iron that the iron particles are held together.

Iron may be used with copper, zinc and tin, or with zinc alone. One example of a satisfactory material for bearings made according to the present invention is given:

|  | Parts by weight |
|---|---|
| Iron | 80 |
| Zinc | 20 |
| Copper | 80 |
| Tin | 2 |

These metals are reduced to a finely divided state, the iron powder being produced by grinding gray cast iron bodies or chips and passing through a suitable screen such as a 100 mesh screen. The iron powder is first intimately mixed with the zinc powder and is then heated to a temperature and for a time sufficient to cause the zinc particles to coat the iron particles, the material still remaining in its finely divided powdered form. The heating is done in a closed chamber and a temperature of about 700° F. has been found satisfactory. Then the zinc coated iron particles are intimately mixed with the tin and copper particles. The mixture is briquetted in a suitable form and is then heated in a preferably non-oxidizing atmosphere and to a temperature and for a time sufficient to cause the formation of a matrix of copper, tin and zinc. It is believed that the zinc, when alloying with copper and tin, does not allow the iron to separate, but a metallic structure is formed which provides a matrix which is firmly bonded to the surfaces of the iron particles.

This metallic structure is porous and will absorb as much as 3% by weight of lubricating oil. Hence this structure is well adapted for bearings. Porosity is believed to be partly due to the fact that carbon particles which are in the cast iron particles provide separation which will hold the iron particles apart sufficiently to provide minute inter-connected voids capable of absorbing lubricant by capillary attraction. Carbon in the form of graphite may be added to the mixture before briquetting to increase the graphite content.

Another formula including zinc which has been found satisfactory is:

| | Parts by weight |
|---|---|
| Cast iron | 50 |
| Copper | 80 |
| Zinc | 20 |
| Tin | 2 |

The invention is not limited to the use of zinc with iron and copper. Another satisfactory formula is:

| | Parts by weight |
|---|---|
| Cast iron | 50 |
| Copper | 90 |
| Tin | 10 |

The cast iron particles may be first coated with copper by heating the mixture of iron and copper powder in a closed vessel to about 1200° F., or by other suitable processes. Then the copper coated iron particles are mixed with the tin particles, and briquetting and sintering carried on as before. Instead of coating the iron particles with copper, the iron particles may be coated with tin, if there is sufficient tin for this purpose provided by the formula.

All of the bearings made by using the formulae given have been found to be considerably stronger than bearings of porous bronze or brass without cast iron. It is believed that the strength of the structure is increased by using a quantity of cast iron powder.

It is also possible to make a porous metallic structure in which iron particles are bound together by a matrix of zinc alone. The iron is treated with all or a part of the zinc in a preliminary operation before briquetting as before, to coat the iron particles with zinc. During sintering, the zinc particles bind themselves together, but do not permit the iron particles to become separated from the zinc matrix.

This invention is not limited to the method above described of coating the iron particles by heating a mixture of iron particles and the metal particles which are to form the coating thereon. This preliminary coating of the iron particles with another metal may be accomplished in any suitable manner, such as by immersing the iron particles in a solution of the salt of the metal which is to form the coating, or by heating the iron particles in a container mixed with the salts of the metal which is to form the coating, or by electro-deposition.

The sintering of metal powder briquettes is carried on preferably in closed containers. The use of a volatile flux in the container is preferred, but not necessary, since it will decrease the time required for sintering. It has been observed that this sintering time must be sufficient for the coating on the iron particles to diffuse with the other metal or metals. The flux should preferably be one which will begin to volatilize shortly before sintering temperature is reached, otherwise a substantial amount of the flux may escape in gaseous form through the crevices around the cover of the container.

While several specific examples have been mentioned as showing what has been found to be satisfactory practice in the manufacture of porous metallic structures, it will be understood that the invention is not limited to the examples given, nor necessarily to porous metallic structures, but may be generally applied to the problem of binding a constituent which has a tendency to become separated; and that the invention embraces, in general, that step by which the constituent which tends to become separated is first coated with one of the other constituents of the mixture of comminuted substances.

What is claimed is as follows:

1. The steps in the method of bonding together cast iron powder and other metal powders including zinc and copper, comprising: heating a mixture of iron and zinc powder under conditions to cause a diffusion between said metals, forming a mixture of said diffused particles and the remaining constituents, and then heating said last mixture to cause a firm bond between the iron, zinc and copper particles.

2. The steps in the method of bonding together cast iron powder and other metal powders including zinc and copper, comprising: heating a mixture of iron and zinc powder under conditions to cause a diffusion between said metals, forming a mixture of said diffused particles and the remaining constituents, briquetting said last mixture to the form desired, and then sintering said briquettes to cause a firm bond between the iron, zinc and copper particles.

3. The steps in the method of forming a porous material from powdered constituents including cast iron, zinc and copper, comprising: heating a mixture of iron and zinc powder under conditions to cause a diffusion between these metal particles, forming a mixture of said diffused particles and the remaining constituent powder or powders, briquetting said last mixture to the form desired, and then sintering said briquettes to firmly bond together said iron, zinc and copper particles.

4. A porous rigid bearing structure comprising a sintered mixture of initially finely divided bi-metal particles of copper-coated cast iron and other metal powder selected from the group zinc, copper and tin, said bi-metal powder forming about 40% to 60% of the total weight, substantially the remainder of metallic content of the sintered mixture being from said group of zinc, copper and tin.

5. A porous rigid bearing structure comprising a sintered mixture of initially finely divided bi-metal particles of copper-coated cast iron and other metal powder selected from the group zinc, copper and tin, said bi-metal powder forming about 40% to 60% of the total weight, substantially the remainder of metallic content of the finished structure being from said group of zinc, copper and tin in such proportions as to form a brass or bronze matrix for the cast iron particles.

6. A porous rigid bearing structure comprising a sintered mixture of initially finely divided bi-metal particles of tin-coated cast iron and other metal powder selected from the group of zinc, copper and tin, said bi-metal powder forming about 40% to 60% of the total weight, substantially the remainder of metallic content of the sintered structure being from said group of zinc, copper and tin in such proportions as to form a brass or bronze matrix for the cast iron particles.

7. The steps in the method of bonding together cast iron powder and other metal powders which have greater affinity for each other than for cast iron and selected from the group of zinc, copper and tin, said method comprising: heating a mixture of cast iron powder and one metal powder of said group to cause a diffusion of the particles of these two metals without agglomerating the mass, then forming a mixture of said diffused metals in powder form and another metal powder of said group, compacting said last mixture, and then sintering same to cause all of said metal powders to be firmly bonded together.

8. The steps in the method of forming a porous structure from powdered constituents including cast iron powder and two or more other powders selected from the group of zinc, copper, tin and graphite, comprising: first heating a mixture of cast iron powder and only one metal powder selected from said group under conditions to cause a union between the metal particles without agglomerating the mass, then forming a second mixture comprising said united metal particles and the remaining powder constituents selected from said group, compacting said last mixture, and then sintering same to form a rigid porous structure.

9. The steps in the method of forming a porous structure from powdered constituents including cast iron powder and two or more other powders selected from the group of zinc, copper, tin and graphite, comprising: first forming a metal powder whose particles comprise cast iron particles bonded to a metal selected from said group, then forming a mixture comprising said bi-metal particles and the remaining powder constituents selected from said group, compacting said last mixture, and then sintering same to form a rigid porous structure.

10. The steps in the method of bonding together cast iron powder and other constituent powder including zinc powder, comprising: heating a mixture of cast iron powder and zinc powder under conditions to cause a diffusion of the particles of these two metals without agglomerating the mass, then forming a mixture of these diffused metals in powdered form and the remaining constituent powder which is selected from the group of copper, tin and graphite, compacting said last mixture, and sintering same to form a porous structure with inter-communicating cells.

11. The method of forming a porous structure from cast iron powder and other constituent material including zinc, comprising: first forming a metal powder whose particles comprise cast iron and zinc bonded together, then forming a mixture comprising said bi-metal particles and the remaining constituent powder which is selected from the group of copper, tin and graphite, compacting said last mixture, and sintering same to form a porous structure having inter-communicating cells.

12. A porous bearing structure having inter-communicating cells comprising: a sintered mixture of previously prepared metal powders, one of said metal powders having bi-metal particles composed of cast iron and a second metal selected from the group of zinc, copper and tin, the remaining metal powder being also selected from said group, said bi-metal powder forming about 40% to 60% of the total weight and having a cast iron content from about two to four times that of the second metal thereof.

13. A porous rigid bearing structure having inter-communicating cells comprising: a sintered mixture of a previously prepared powder comprising finely divided bi-metal particles of zinc-coated cast iron and copper powder, said bi-metal powder forming about 40% to 60% of the total weight and having a cast iron content roughly from two to four times the zinc content thereof, substantially the remainder of metallic content of the sintered mixture being copper.

14. A porous rigid bearing structure having inter-communicating cells comprising: a sintered mixture of a previously prepared powder comprising finely divided bi-metal particles of zinc-coated cast iron and copper powder, the content of cast iron being roughly from 30% to 45% of the total weight, and the zinc content being from one-half to one-fourth of the cast iron content, substantially the remainder of metallic content of the sintered mixture being copper.

CHARLES R. SHORT.